Nov. 5, 1957

C. J. WESTLING 2,812,153

VALVE PLATE STRUCTURE

Filed June 7, 1951

INVENTOR
CARL J. WESTLING
by Hoopes Leonard & Glenn
his attorneys

Nov. 5, 1957

C. J. WESTLING 2,812,153

VALVE PLATE STRUCTURE

Filed June 7, 1951

INVENTOR
CARL J. WESTLING his Attorneys

United States Patent Office 2,812,153
Patented Nov. 5, 1957

2,812,153

VALVE PLATE STRUCTURE

Carl J. Westling, West Orange, N. J., assignor to Vulcan Research Corporation, Pittsburgh, Pa., a corporation of Pennsylvania Application June 7, 1951, Serial No. 230,332

8 Claims. (Cl. 251—84)

This invention relates to a valve plate structure and the manufacture thereof. It has to do particularly with valve plate structures of the type used in so-called goggle or plate valves and provides advantages not heretofore obtained in such structures.

A goggle or plate valve is a valve which is disposed in a conduit, generally a conduit of large diameter, usually employed for the flow of gas, the valve having opposed rings relatively movable toward and away from each other and a plate mounted for movement in a plane transversely of the conduit and intersecting the conduit so that the plate can be moved to one position in which it shuts off flow through the conduit and another position in which either the plate is offset entirely from the conduit or a hole in the plate is in line with the conduit. When the plate is in operative or closed position the opposed rings are made to seat against the opposite faces of the plate at an imperforate portion thereof. When the valve is open the opposed rings either directly engage each other (if the plate is offset entirely from the conduit) or engage the plate at the periphery of an opening in the plate which is in line with the conduit.

The plate is provided with seat portions against which the rings are pressed when the valve is closed, and also when it is open if it be of the type having a hole in line with the conduit in the open position of the valve. The seat portions are designed to cooperate with the rings to effect a seal to prevent leakage between the rings and the plate of the particular fluid being handled in the conduit. The seat portions are of different characters for different fluids and to meet different conditions of use. For example, a seat portion or seat member may be of heavy plate such as steel, with or without metallic or other gasket material inserted into annular seat grooves in the plate, or of relatively thin plate with annular gasket faces, such, for example, as of non-corrosive metal such as stainless steel or copper alloy, applied to the plate as by riveting and/or caulking or otherwise.

Valves of the type above referred to are generally of large size; they are used in conduits whose diameters are measured in feet. Hence the valve plates are large and massive. Heretofore it has been considered necessary to determine finally at the time of manufacturing the valve plate the character of the seat portion thereof; and once that has been determined it has not been possible to change the seat portion. Ordinarily the seat portion has been integral with the valve plate or at least it has been necessary to machine the seat portion while it is a part of the valve plate, necessitating the use of a huge boring mill.

I provide a valve plate structure having important advantages over valve plate structures heretofore proposed. I separately form a plate blank or body and a seat member or seat members and apply the seat member or seat members to the body. Preferably I provide a plate-like body having a hole therethrough and a seat member of approximately the shape of the hole in the body adapted to be inserted into the hole and fastened to the body. The seat member may be separately machined on a much smaller boring mill than is necessary to machine a seat portion of the same size as the seat member integral with a valve plate. A great advantage is that the entire goggle or plate valve can be manufactured either for stock or for a non-predetermined use, the seat members being selected and applied when the precise use to which the valve is to be put or the precise conditions of use are determined. Thus valve may be stocked and upon receipt of the customer's specifications seat members of characteristics desired by the customer may be inserted into the valve plates whereupon the valves may immediately be installed and put into use. Also it is possible to replace the seat members with other seat members if desired and to remove the seat members for maintenance and servicing purposes and thereafter replace the same.

I also provide for loosely holding the seat member in the hole in the plate body so that the seat member has limited movement relatively to the plate body to enable the seat member to adjust its position relatively to the body to accommodate itself to the cooperating valve elements or rings despite possible warping of the plate body.

I preferably make the body and seat member of substantially the same thickness so that their respective faces are substantially flush with each other. This avoids possible damage to the seat member in the event that the plate should be moved before the valve elements cooperating with the seat member have been sufficiently spread apart as might occur when a projecting seat member is used. This feature also avoids excessive leakage in valves equipped with blast hoods used where excessive leakage may be dangerous. If the body is thinner than the seat member or seat members it may be provided with suitable pad strips for the purpose of seat surface protection.

I preferably employ seat member retaining means disposed at at least a portion of the periphery of the hole in the plate body and fastened to the body, the seat member being maintained in place relatively to the body by the retaining means.

The seat member retaining means may lie at the opposed surfaces of the body and overlap the edge of the hole in the body. The seat member retaining means may be disposed at generally diametrically opposed portions of the periphery of the hole in the body. The seat member retaining means may comprise retaining elements disposed at generally diametrically opposed portions of the periphery of the hole, fastened to the body and lying at the opposed surfaces thereof and overlapping the edge of the hole to maintain the seat member in place relatively to the body, at least one of the retaining elements preferably being readily removable from the body to permit removal of the seat member.

In one embodiment of my invention four seat member retaining elements may be employed, a pair disposed at each surface of the body, the elements of each pair being disposed at generally diametrically opposed portions of the periphery of the hole, at least one of the four retaining elements being readily removable from the body to permit removal of the seat member. For example, three of the four seat member retaining elements may be welded to the body while the fourth may be removably bolted to the body.

I may employ a seat member retainer disposed in the hole in the plate body and fastened to the body, the seat member being carried by the retainer. The retainer may lie generally against the periphery of the hole and may be of generally channel-shaped cross-section with the channel opening facing toward the center of the hole and the seat member may have a portion entering the channel.

The seat member may be loosely carried by the retaining means, the portion thereof cooperating with the retaining means having limited movement relatively thereto to enable the seat member to adjust its position relatively to the body to accommodate itself to the cooperating valve elements. For example, when a retainer as described in the preceding paragraph is employed the seat member may have a peripheral projection projecting generally parallel to the general plane of the seat member and entering the channel of the retainer, the thickness of the projection being somewhat less than the inside width of the channel. The seat member retainer may be welded to the body. In one construction the seat member has a body portion and a peripheral projection projecting from the body portion generally in the central plane of the seat member and entering the channel of the retainer, the external dimension of the body portion of the seat member in the general plane of the structure being somewhat less than the internal dimension of the retainer at the flanges thereof, the external dimension of the flange of the seat member in the general plane of the structure being somewhat less than the internal dimension of the retainer at the bottom of the channel thereof, the thickness of the projection being somewhat less than the inside width of the channel.

The external dimension of the retainer when disposed peripherally about the seat member and tightly engaging the seat member is preferably such that the seat member with the retainer thus disposed thereabout may be inserted into the hole in the body with clearance between the retainer and the body and I preferably insert the seat member with the retainer thus disposed thereabout into the hole in the body, expand the retainer to take up the clearance between it and the body and to form clearance between the retainer and the seat member and fasten the retainer to the body.

Desirably the retainer is disposed peripherally about the seat member and in transverse interlocking engagement therewith so that the external dimension of the retainer when disposed peripherally about the seat member is such that the seat member with the retainer disposed peripherally thereabout may be inserted into the hole in the body and I preferably insert the seat member with the retainer disposed peripherally thereabout into the hole in the body and fasten the retainer to the body with clearance between the retainer and the seat member whereby the retainer holds the seat member against removal but at the same time permits limited movement thereof relatively to the body.

The retainer may be fastened to the body in various ways, welding being indicated. Intermittent welds may be employed since there is no need of continuously sealing the retainer to the body.

Other details, objects and advantages of the invention will become apparent as the following description of certain present preferred embodiments of the invention and certain present preferred methods of practicing the same proceeds.

In the accompanying drawings I have shown certain present preferred embodiments of the invention and have illustrated certain present preferred methods of practicing the same in which Figure 1 is a face view of a valve plate structure;

Figure 1:
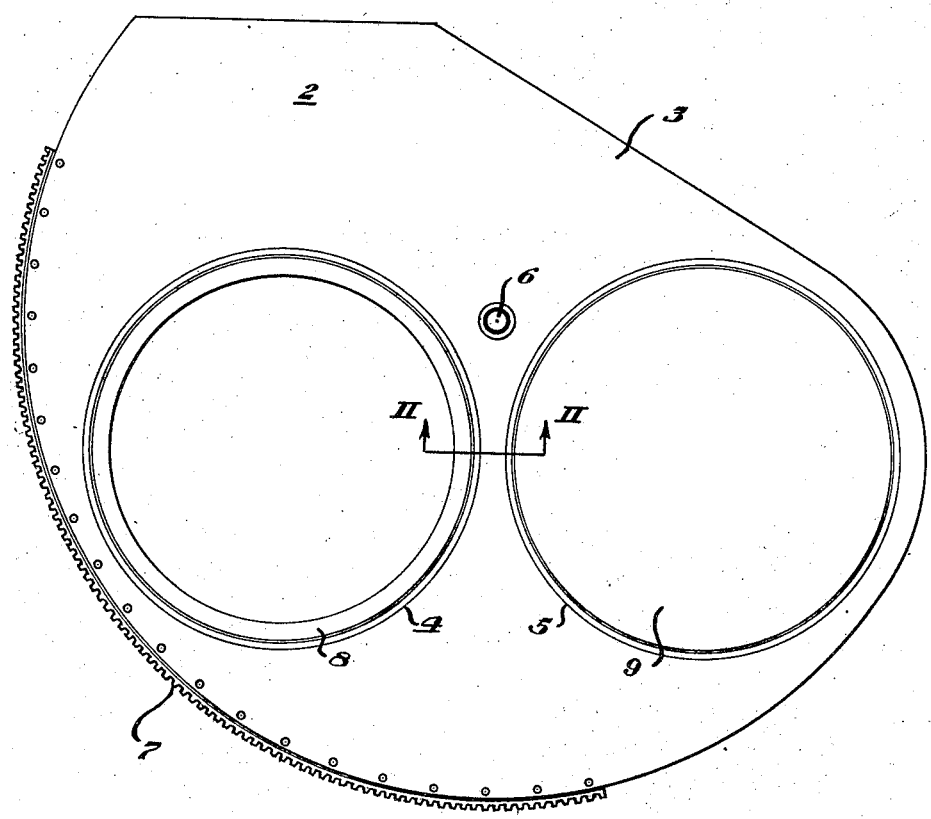
Figure 2:
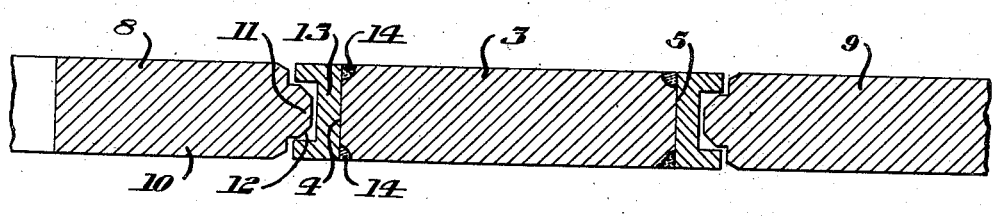
Figure 2 is a greatly enlarged fragmentary cross-sectional view taken on the line II—II of Figure 1.

Referring now more particularly to Figures 1 and 2, there is shown therein and designated generally by reference numeral 2 a valve plate structure which comprises a plate-like blank or body 3 having therethrough two circular holes 4 and 5 respectively. The valve plate 2 is adapted to be pivotally mounted at 6 for turning movement between open and closed positions. The valve may be turned by any suitable mechanism, such, for example, as a pinion meshing with a segmental rack 7 connected with the plate at its edge and coaxial with the axis about which the valve turns.

Disposed in the circular hole 4 of the valve is a seat member 8. Disposed in the circular hole 5 of the valve is a seat member 9. The seat member 8 is annular while the seat member 9 is a solid circular plate. When the valve is open the seat member 8 is aligned with the conduit in which the valve is disposed. When the valve is closed the seat member 9 is aligned with the conduit. When the valve has been moved to position either of the seat members in line with the conduit the cooperating valve elements or rings are moved so as to seat against the seat member at opposite sides thereof to prevent leakage of gas therepast.

Both of the seat members 8 and 9 are mounted in the plate body in the same manner so description of the mounting of one will suffice for both. Likewise the external shapes of the seat members 8 and 9 are the same so that description of one will suffice for both. Taking the seat member 8 by way of example, it comprises a body portion 10 and a peripheral projection 11 projecting from the body portion 10 generally in the central plane of the seat member 8. The corner edges of the projection 11 are shown as being chamfered as indicated at 12.

Disposed about the seat member 8 is a seat member retainer designated generally by reference numeral 13. The retainer 13 is of generally channel-shaped cross-section as shown in Figure 2 with the channel opening facing toward the center of the seat member. The projection 11 enters the channel of the retainer 13.

The retainer 13 is preferably applied to the seat member 8 before the seat member and retainer are applied to the body 3. The retainer may be bent around the seat member with the projection 11 of the seat member in the channel of the retainer and the retainer may be drawn up tightly against the seat member so that the seat member with the retainer drawn up tightly thereabout may easily be inserted into the hole 4 in the plate body 3. When the retainer is drawn up tightly about the seat member and the seat member with the retainer thus disposed thereabout is inserted into the hole 4 there may be clearance between the outer periphery of the retainer and the plate body 3 about the hole therein. When the seat member with the retainer thereabout has been introduced into the hole 4 the retainer is disposed flush against the annular surface of the plate body 3 defining the hole 4 and is preferably welded to the plate body by welds 14. The welds 14 may be continuous or intermittent. Intermittent welds are sufficient as it is not necessary to continuously seal the retainer 13 to the plate body 3.

When the retainer has thus been fastened to the plate body 3 there is clearance between the seat member 8 and the retainer providing for limited movement of the seat member within the retainer and relatively to the plate body to enable the seat member to adjust its position to accommodate itself to the valve rings.

In the structure shown in Figures 1 and 2 the external dimension of the body portion 10 of the seat member 8 in the general plane of the structure is somewhat less than the internal dimension of the retainer 13 at the flanges thereof, the external dimension of the peripheral projection 11 of the seat member in the general plane of the structure is somewhat less than the internal dimension of the retainer at the bottom of the channel thereof and the thickness of the projection 11 is somewhat less than the inside width of the channel. The seat member 8 and the retainer 13 are of substantially the same thickness as the plate body 3 so that their respective faces at each side are substantially coplanar or substantially flush with each other.

Figure 3:
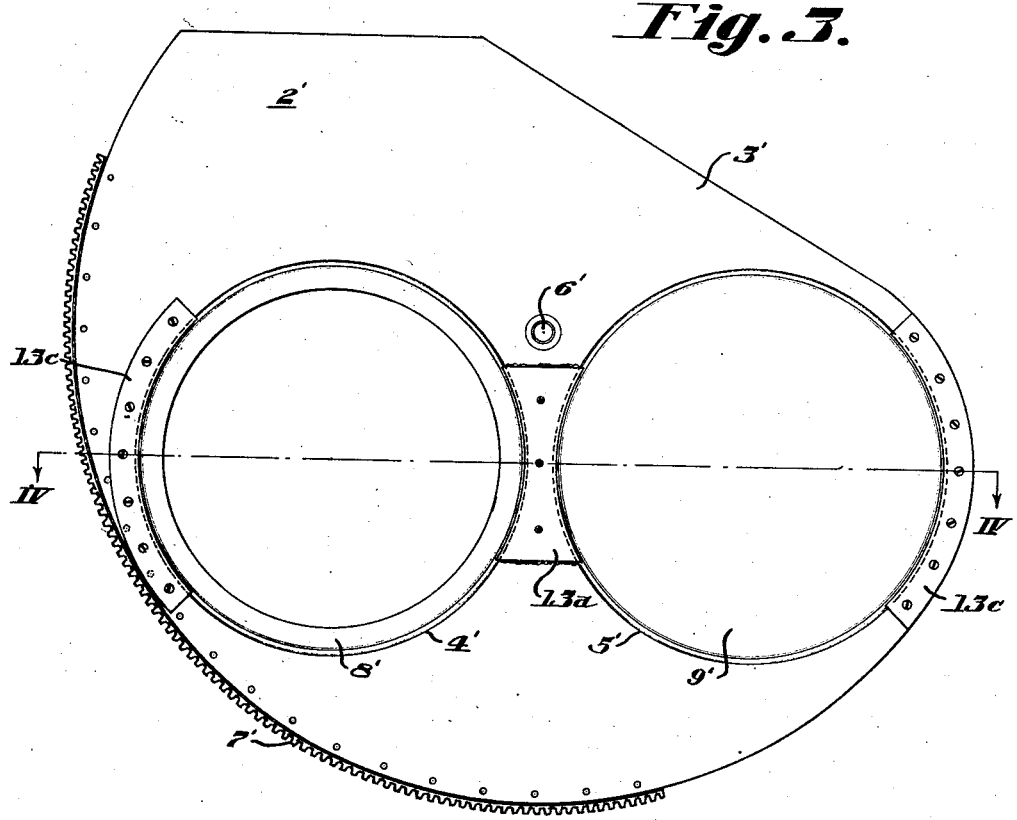
Figure 3 is a view similar to Figure 1 showing a modified construction.
Figure 4:
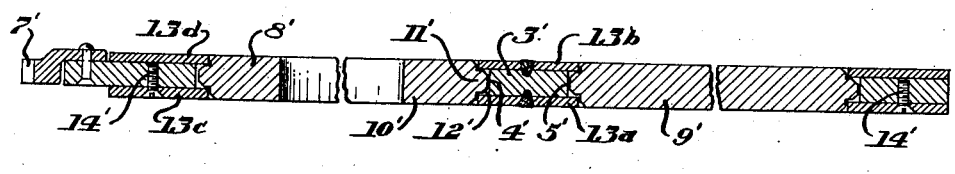
Figure 4 is a cross-sectional view taken on the line IV—IV of Figure 3.

Referring now more particularly to Figures 3 and 4, there is shown therein and designated generally by reference numeral 2' a valve plate structure which comprises a plate-like blank or body 3' having therethrough two circular holes 4' and 5' respectively. The valve plate 2' is adapted to be pivotally mounted at 6' for turning movement between open and closed positions. The valve may be turned by any suitable mechanism, such, for example, as a pinion meshing with a segmental rack 7' connected with the plate at its edge and coaxial with the axis about which the valve turns.

Disposed in the circular hole 4' of the valve is a seat member 8'. Disposed in the circular hole 5' of the valve is a seat member 9'. The seat member 8' is annular while the seat member 9' is a solid circular plate. The valve operates in the same manner as the valve of Figures 1 and 2.

Both of the seat members 8' and 9' are mounted in the plate body in the same manner so description of the mounting of one will suffice for both. Likewise the external shapes of the seat members 8' and 9' are the same so that description of one will suffice for both. Taking the seat member 8' by way of example, it comprises a body portion 10' and a peripheral projection 11' projecting from the body portion 10' generally in the central plane of the seat member 8'. The corner edges of the projection 11' are shown as being chamfered as indicated at 12'.

The seat member 8' is maintained in place relatively to the body 3' by seat member retaining means disposed at at least a portion of the periphery of the hole 4'. The seat member retaining means comprises four seat member retaining elements 13a, 13b, 13c and 13d. The elements 13a, 13b and 13d are welded to the plate 3' while the element 13c is removably fastened to the plate 3' by screws or bolts 14'. The elements 13a and 13c are disposed at one surface of the body while the elements 13b and 13d are disposed at the opposite surface of the body. The elements of each pair, i. e., 13a and 13c, and 13b and 13d, are disposed at generally diametrically opposed portions of the periphery of the hole 4' and overlap the edge of the hole to maintain the seat member 8' in place relatively to the body while permitting relative movement between the seat member and the body for the reason above explained. When it is desired to remove the seat member 8' the retaining element 13c is removed by first removing the screws or bolts 14'. The same or another seat member may then be set in place in the hole 8' and the element 13c replaced and fastened to the plate to retain the seat member in place. The elements 13a and 13b are shown as also overlapping the edge of the hole 5' to assist in maintaining in place the seat member 9' along with other retaining elements analogous to the retaining elements 13c and 13d.

Thus when my invention is employed it is possible to make up a goggle or plate valve complete except for the seat member or seat members and apply the same after the valve has been otherwise completed to meet the customer's specifications. If desired the seat members may be removed and replaced by other seat members. The seat members automatically adjust themselves to the valve rings. Danger of damage to the seat members is avoided by their flush relationship to the plate body when they are so disposed.

A method of making a valve plate structure as above described is claimed in my divisional application Serial No. 351,067, filed April 27, 1953.

While I have shown and described certain present preferred embodiments of the invention and have illustrated certain present preferred methods of practicing the same it is to be distinctly understood that the invention is not limited thereto but may be otherwise variously embodied and practiced within the scope of the following claims.

I claim:

1. A valve plate structure comprising a plate-like body having a hole therethrough, opposed seat member retaining portions disposed at at least a portion of the periphery of the hole and fastened to the body with the outside faces of the respective retaining portions substantially flush with the respective outside faces of the body and a seat member maintained in place relatively to the body by the retaining portions, the seat member having part thereof disposed in between the opposed seat member retaining portions with clearance between the seat member and the seat member retaining portions so that the seat member is somewhat loose whereby it may adjust its position relatively to the seat member retaining portions, the thickness of the seat member being approximately equal to the distance between the outside faces of the retaining portions.

2. A valve plate structure comprising a plate-like body having a hole therethrough, a seat member retainer disposed in the hole and fastened to the body, the seat member retainer having opposed rigid retaining portions, and a seat member carried by the retainer and having part thereof disposed in between the opposed rigid retaining portions with clearance between the seat member and the retaining portions so that the seat member is somewhat loose whereby it may adjust its position relatively to the retaining portions.

3. A valve plate structure comprising a plate-like body having a hole therethrough, a seat member retainer disposed in the hole and fastened to the body, the seat member retainer having opposed retaining portions, and a seat member carried by the retainer and having part thereof disposed in between the opposed retaining portions with clearance between the seat member and the retaining portions so that the seat member is somewhat loose whereby it may adjust its position relatively to the retaining portions, the body and seat member being of substantially the same thickness.

4. A valve plate structure comprising a plate-like body having a hole therethrough, a seat member retainer of generally U-shaped cross-section disposed in the hole and welded to the body and a seat member loosely carried by the retainer, the seat member having limited movement relatively to the retainer.

5. A valve plate structure comprising a plate-like body having a hole therethrough, a seat member retainer disposed in the hole and welded to the body, the retainer lying generally against the periphery of the hole and being of generally channel-shaped cross-section with the channel opening facing toward the center of the hole, and a seat member loosely carried by the retainer, the body and seat member being of substantially the same thickness with their respective faces at each side substantially coplanar, the seat member comprising a body portion and a peripheral projection projecting from the body portion generally in the central plane of the seat member and entering the channel, the external dimension of the body portion of the seat member in the general plane of the structure being somewhat less than the internal dimension of the retainer at the flanges thereof, the external dimension of the peripheral projection of the seat member in the general plane of the structure being somewhat less than the internal dimension of the retainer at the bottom of the channel thereof, the thickness of the projection being somewhat less than the inside width of the channel.

6. A valve plate structure as defined in claim 1 in which the seat member retaining portions lie at the opposed surfaces of the body and overlap the edge of the hole.

7. A valve plate structure as defined in claim 1 in which the seat member retaining portions are disposed at generally diametrically opposed portions of the periphery of the hole, are fastened to the body and lie at the opposed surfaces thereof and overlap the edge of the hole, at least one of the retaining portions being readily removable from the body to permit removal of the seat member.

8. A valve plate structure as defined in claim 1 in which there are four seat member retaining portions, a pair disposed at each surface of the body, the portions of each pair being disposed at generally diametrically opposed portions of the periphery of the hole, the retaining portions overlapping the edge of the hole and being fastened to the body, at least one of the four retaining portions being readily removable from the body to permit removal of the seat member.

References Cited in the file of this patent

UNITED STATES PATENTS

| | | |
|---|---|---|
| 424,715 | Knickerbacker | Apr. 1, 1890 |
| 1,812,069 | Westling | June 30, 1931 |
| 1,909,479 | Wilson | May 16, 1933 |
| 2,062,584 | Langdon | Dec. 1, 1936 |
| 2,195,923 | Hehemann | Apr. 2, 1940 |
| 2,219,504 | Willis | Oct. 29, 1940 |
| 2,236,180 | Kost | Mar. 25, 1941 |
| 2,290,619 | Rieger | July 21, 1942 |
| 2,330,610 | Natter | Sept. 28, 1943 |
| 2,407,951 | Daniel | Sept. 17, 1946 |
| 2,636,560 | Rogers | Apr. 28, 1953 |
| 2,705,019 | Volpin | Mar. 29, 1955 |

FOREIGN PATENTS

| | | |
|---|---|---|
| 21,566 | Great Britain | of 1894 |